United States Patent [19]
Condon, Jr. et al.

[11] Patent Number: 4,512,673
[45] Date of Patent: Apr. 23, 1985

[54] BEARING CUP WITH EXTERNAL RESTRAINING FLANGE

[75] Inventors: Charles E. Condon, Jr., Harwinton; J. Peter Malik, Watertown, both of Conn.

[73] Assignee: The Torrington Company, Torrington, Conn.

[21] Appl. No.: 528,603

[22] Filed: Sep. 1, 1983

[51] Int. Cl.³ .............................................. F16C 33/58
[52] U.S. Cl. .................... 384/569; 384/585; 308/DIG. 11
[58] Field of Search .................. 308/207 R, 216, 236, 308/DIG. 11; 464/128; 384/569, 585

[56] References Cited

U.S. PATENT DOCUMENTS

| | | | |
|---|---|---|---|
| 3,311,432 | 3/1967 | Cowles | 308/216 |
| 3,423,813 | 1/1969 | Bloomquist | 308/216 |
| 4,180,989 | 1/1980 | Lange | 464/128 |

Primary Examiner—Lenard A. Footland
Attorney, Agent, or Firm—F. S. Troidl

[57] ABSTRACT

An annular external restraining flange on the cylindrical body of a bearing cup for rollers prevents the bearing from moving into the housing supporting the bearing.

3 Claims, 4 Drawing Figures

BEARING CUP WITH EXTERNAL RESTRAINING FLANGE

This invention relates to new and useful improvements in bearings, and more particularly to a novel needle roller bearing construction.

The customary needle roller bearing includes a bearing shell or cup in which the rollers are positioned with the bearing shell or cup forming the outer race for the rollers. In the mounting of these bearings, a bore is formed through the housing in which the bearing is to be mounted, after which the bearing shell or cup is pressed into the bore. The bearing cup is retained within the housing by the frictional engagement of the bearing cup with the housing due to the press fit between the bearing cup and the housing. Under normal conditions, a shaft rotatably journaled within such a bearing exerts very minor, if any, axial forces on the bearing which tend to move the bearing into the housing axially of the shaft. However, in some installations, there are very heavy forces on the shafts which are transmitted through the bearings to thin wall or low tensile strength housings and tend to cause the bearing to move inwardly into the housing.

The inward movement of the bearing into the housing during operation often allows contact between the bearing cup and/or rollers and an adjacent rotating member such as a rotating shaft. This causes excessive wear and heat generation which leads to pre-mature bearing failure.

It has been found that to make the press fit between the bearing cup and the housing, a tighter one to increase the frictional resistance to the movement of the bearing cup relative to the housing does not solve the problem.

The U.S. Pat. No. 3,311,432 issued Mar. 28, 1967 to J. H. Cowles, and entitled "Bearing Cup with External Restraining Flange" discloses a bearing cup for rollers which has an external restraining flange that engages the face of the housing wall for preventing the movement of the bearing cup through the housing. The U.S. Pat. No. 3,311,432 bearing cup is provided with reversely folded flanges which are connected together by a bight at one end of the bearing cup.

Though the Cowles cup shown in U.S. Pat. No. 3,311,432 has been successful and useful, it costs more to make than the usual bearing. Our novel bearing cup and bearing is a new structure for preventing the walking inwardly of a bearing contained in a housing. Our bearing is much easier to make, and cheaper than the bearing shown in U.S. Pat. No. 3,311,432.

Briefly described the new bearing cup for rollers has a cylindrical shell with an annular external restraining flange separating the cylindrical shell into two sections of different outside diameters.

The cylindrical shell defines an outer bearing race. A plurality of rollers are retained within the shell and in contact with said shell to form a roller bearing. When the new bearing is inserted into a bore formed in the wall of a housing, the annular external restrainer flange abuts the wall and prevents movement of the bearing cup through the wall in the axial direction of the shaft upon which the bearing is mounted.

Our novel method of making a bearing cup for rollers comprises the step of longitudinally displacing an outside portion of a cylindrical body or shell around its complete circumference to form a bearing cup with an annular external restraining flange.

The invention as well as its many advantages may be further understood by reference to the following detailed description and drawings in which.

In the various figures, like parts are referred to by like numbers.

Figure 1:
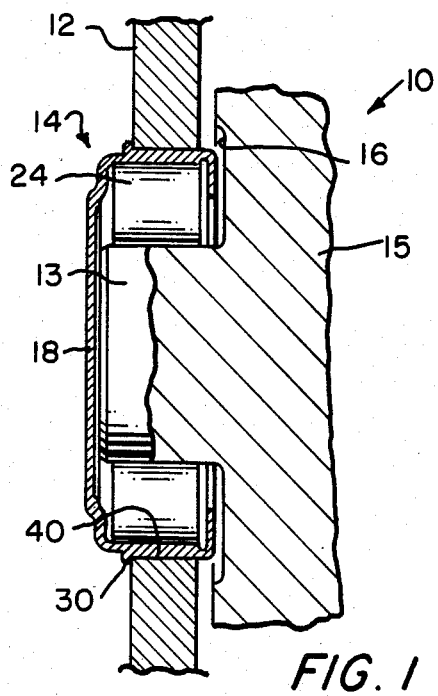
FIG. 1 is a side view, partly in section, of a housing having mounted therein a shaft which passes through the housing and which is rotatably journaled within the housing by means of a roller bearing in accordance with this invention.

Referring to the drawings in detail, and particularly to FIG. 1, it will be seen that there is illustrated a typical shaft mounting utilizing a roller bearing which is the subject of this invention. A shaft 10 passes through a housing wall 12 and is rotatably journaled within the housing wall 12 by means of a roller bearing formed in accordance with this invention, the roller bearing being generally referred to by the number 14. The shaft 10 has a portion 13 extending into the roller bearing 14 and a portion 15 of greater diameter than portion 13.

It is to be understood that no attempt has been made to illustrate a specific type of housing. However, one typical use of the shaft mounting is illustrated in FIG. 1. In said figure, the front surface 16 of portion 15 of shaft 10 would be contacted by either the cup and/or the rollers contained in the roller bearing 14 if the bearing 14 were permitted to move inwardly toward the front surface 16 of the rotating shaft 10. Such contact would cause excessive wear, heat generation, and lead to premature bearing failure. In accordance with this invention, it is proposed to make the roller bearing which supports the shaft in a manner whereby once the roller bearing has been pressed into the housing, movement of the bearing in the direction in which it is pressed into the housing is prevented.

Figure 2:
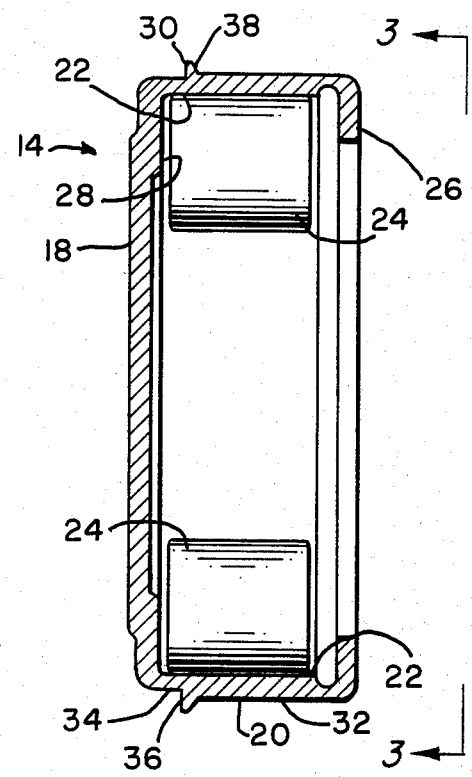
FIG. 2 is an enlarged sectional view taken through the roller bearing and shows the specific details of the same as they would appear when the bearing is not mounted within the housing.

As seen from FIG. 1 and FIG. 2, the roller bearing 14 includes a bearing cup or shell which is generally referred to by the number 18. The bearing cup includes a cylindrical body 20 having an inner surface 22 which defines an outer race for a plurality of rollers 24 positioned within the bearing cup 18. The rollers 24 are illustrated as directly rolling against the shaft portion 13 although an inner race defining sleeve can be mounted on the shaft for engagement by the rollers 24.

Roller retention means are provided at each end of the bearing cup body 20. The bearing cup body 20 is provided with an inwardly directed flange 26 at one end. At the other end, the roller retention means is an annular roller retention surface 28 on the closed end of the roller bearing 14.

Figure 3:
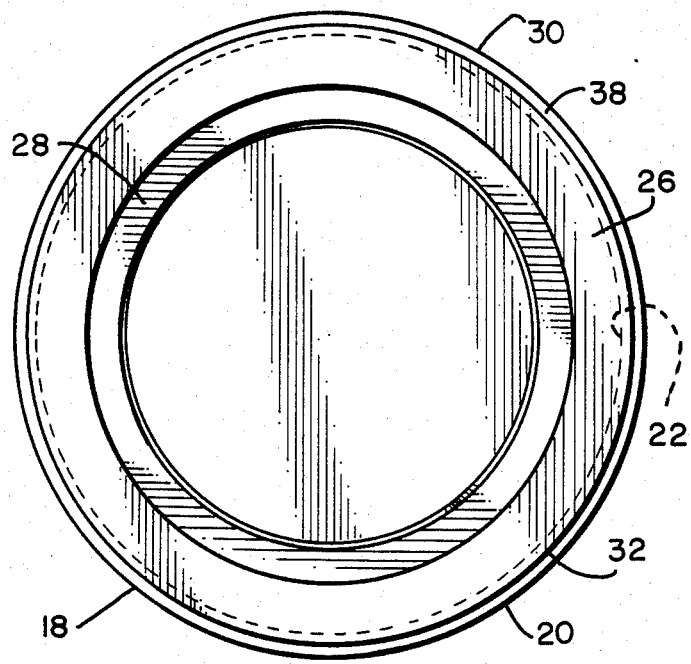
FIG. 3 is an end view of the roller bearing of FIG. 2.

An integral annular external restraining flange 30, see FIG. 2 and FIG. 3, separates the shell 20 into two sections 32 and 34 of different outside diameters. Section 32 extends from the end having flange 26 the major length of shell 20. The smaller outside diameter section 34 extends from the closed end a minor or short distance. The restraining flange 30 has a surface 36 extending radially substantially perpendicularly from the cylindrical shell secton 34. The annular external restraining flange 30 also has an inclined surface 38 extending from the shell section 32 to the surface 36 of the external restraining flange 30.

In the mounting of the bearing 14 within the housing wall 12, the housing wall is provided with a bore 40. The bore is of a size to require the pressing of the bearing cup 14 into the housing wall 12. The bearing cup 14 is pressed into the bore 40 from left to right, as viewed in FIG. 1. The bearing cup 14 is pressed into the bore 40 until the external restraining flange 30 comes into engagement with the outer surface or face of the housing wall 12. The restraining flange 30 now serves to prevent further movement of the bearing cup 14 to the right through the bore 40 into the interior of the housing of which the housing wall 14 is a part.

Figure 4:
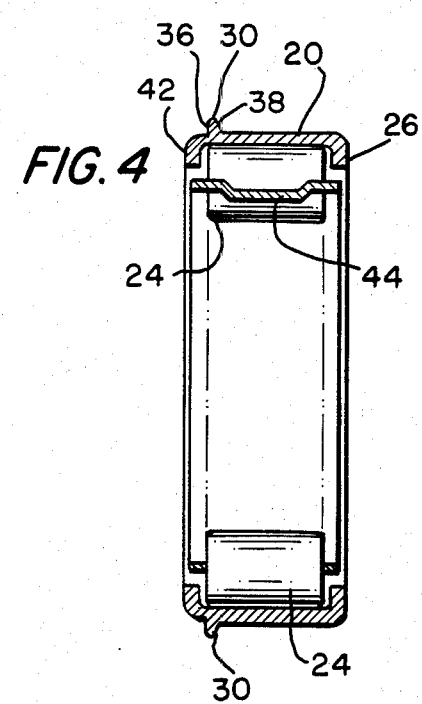
FIG. 4 is a sectional view of a second preferred embodiment of a roller bearing.

If instead of the shaft 10 terminating close to the end of the wall 12, a shaft should be used which extends beyond the wall 12, the bearing embodiment shown in FIG. 4 may be used instead of the bearing embodiment shown in FIG. 1, FIG. 2, and FIG. 3. The bearing shown in FIG. 4 is similar to the bearing shown in FIG. 1, FIG. 2, and FIG. 3 except that neither end is closed. The flange 42 extends radially inwardly from the cup surface 20. Flange 42 and radially inwardly extending flange 26 at the other end retain the rollers 24 against longitudinal movement. The rollers 24 are kept circumferentially properly spaced by a cage 44.

The bearing cup of this invention can be made easier and cheaper than other bearing cups such as the bearing cup shown in U.S. Pat. No. 3,311,432. To form the annular external full circumference restraining member 30, it is only necessary to first form a cup having a constant outside diameter throughout its length. Thereafter, a press or other suitable mechanism (not shown) is used to displace a portion of the sheet metal from one end of the cup to form restraining member 30 leaving the smaller outside diameter section 34. Thus, the external restraining flange 30 is made up of metal which has been displaced from that portion of the cup which now forms section 34 of less outside diameter than section 32.

We claim:

1. A bearing cup for rollers comprising: a cylindrical shell having at least one open end and an annular external restraining flange formed by longitudinally displacing a portion of the metal from one end of a cylindrical member having a constant outside diameter throughout its length, the annular external restraining flange separating the cylindrical shell into two sections of different outside diameters and having an annular surface extending substantially perpendicularly from the cylindrical shell smaller outside diameter section; and an inclined annular surface extending from the cylindrical shell larger diameter outside diameter section.

2. A roller bearing comprising: a bearing cup having a cylindrical shell defining an outer bearing race, a plurality of rollers within said body in rolling contact therwith, said shell having at opposite ends inwardly directed roller retaining means; and an integral annular external restraining flange formed by longitudinally displacing the outside portion of a cylindrical shell having a constant diameter throughout its length and separating the cylindrical shell into two sections of different outside diameters said flange having an annular surface extending substantially perpendicularly from the cylindrical shell smaller outside diameter section and an inclined annular surface extending from the cylindical shell larger diameter outside diameter section.

3. A machine unit comprising: a housing having a wall with a bore; a shaft extending through said bore, and a roller bearing tightly seated within said bore and supporting the shaft for rotation, the shaft being subjected to forces transmittable through the bearing and the wall tending to move the bearing through the wall, the roller bearing including rollers and a bearing cup having an annular external restraining flange adjacent one end with an inclined annular surface abutting the wall and preventing movement of the bearing cup through the wall in the axial direction of the shaft.

* * * * *